(12) United States Patent
Lee

(10) Patent No.: US 10,579,264 B2
(45) Date of Patent: Mar. 3, 2020

(54) MEMORY SYSTEM AND OPERATING METHOD THEREOF

(71) Applicant: SK hynix Inc., Gyeonggi-do (KR)

(72) Inventor: Dong-Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 110 days.

(21) Appl. No.: 15/704,699

(22) Filed: Sep. 14, 2017

(65) Prior Publication Data

US 2018/0217754 A1 Aug. 2, 2018

(30) Foreign Application Priority Data

Feb. 2, 2017 (KR) ........................ 10-2017-0015140

(51) Int. Cl.
| | | |
|---|---|---|
| *G06F 11/14* | (2006.01) | |
| *G06F 12/08* | (2016.01) | |
| *G06F 12/0808* | (2016.01) | |
| *G06F 12/0815* | (2016.01) | |
| *G06F 3/06* | (2006.01) | |
| *G06F 13/18* | (2006.01) | |

(52) U.S. Cl.
CPC .......... *G06F 3/0604* (2013.01); *G06F 3/0611* (2013.01); *G06F 3/0619* (2013.01); *G06F 3/0659* (2013.01); *G06F 3/0679* (2013.01); *G06F 3/0685* (2013.01); *G06F 13/18* (2013.01)

(58) Field of Classification Search
CPC ..... G06F 3/0604; G06F 3/0659; G06F 3/0679
USPC ........................................................ 711/158
See application file for complete search history.

(56) References Cited

U.S. PATENT DOCUMENTS

| | | | | |
|---|---|---|---|---|
| 6,055,579 A | * | 4/2000 | Goyal ................... | G06F 9/4881 712/28 |
| 6,609,189 B1 | * | 8/2003 | Kuszmaul ............... | G06F 7/506 708/421 |
| 8,601,169 B1 | * | 12/2013 | Paragaonkar ......... | G06F 3/0613 710/52 |
| 2006/0129764 A1 | * | 6/2006 | Bellows .............. | G06F 13/1631 711/125 |
| 2008/0189501 A1 | * | 8/2008 | Irish .................... | G06F 13/1631 711/167 |
| 2013/0198416 A1 | * | 8/2013 | Zhu ........................ | G06F 3/0659 710/6 |
| 2013/0242749 A1 | * | 9/2013 | Herz .................... | G06F 11/0745 370/241 |
| 2015/0234756 A1 | * | 8/2015 | Tuers ...................... | G06F 13/18 710/308 |
| 2015/0356033 A1 | * | 12/2015 | Rose .................... | G06F 13/1642 710/310 |

(Continued)

FOREIGN PATENT DOCUMENTS

| | | |
|---|---|---|
| KR | 1020140141348 | 12/2014 |
| KR | 1020150035876 | 4/2015 |

(Continued)

*Primary Examiner* — Mohamed M Gebril
(74) *Attorney, Agent, or Firm* — IP & T Group LLP

(57) ABSTRACT

A memory system may include: a plurality of memory dies; and a controller suitable for identifying a dependency between first and second commands and a priority order of the first and the second commands through a check engine, and control the memory dies to sequentially perform first and second command operations in response to the first and second commands according to the dependency and the priority order.

16 Claims, 12 Drawing Sheets

(56) References Cited

U.S. PATENT DOCUMENTS

| | | | |
|---|---|---|---|
| 2016/0202914 A1* | 7/2016 | Hsu | G06F 3/0604 |
| | | | 714/49 |
| 2017/0060680 A1* | 3/2017 | Halbert | G06F 11/1068 |
| 2017/0322726 A1* | 11/2017 | Walker | G06F 13/1626 |
| 2018/0136877 A1* | 5/2018 | Ouyang | G06F 3/0659 |
| 2018/0217754 A1* | 8/2018 | Lee | G06F 3/0604 |

FOREIGN PATENT DOCUMENTS

| | | |
|---|---|---|
| KR | 1020150074564 | 7/2015 |
| KR | 1020150118207 | 10/2015 |

* cited by examiner

MEMORY SYSTEM AND OPERATING METHOD THEREOF

CROSS-REFERENCE TO RELATED APPLICATIONS

The present application claims priority of Korean Patent Application. No. 10-2017-0015140, filed on Feb. 2, 2017, which is incorporated herein by reference in its entirety.

BACKGROUND

1. Field

Exemplary embodiments relate to a memory system and, more particularly, to a memory system that processes data to a memory device and an operating method thereof.

2. Description of the Related Art

The computer environment paradigm has changed to ubiquitous computing systems that can be used anytime and anywhere. Due to this fact use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a memory system capable of minimizing its complexity and performance deterioration, maximizing the use efficiency of a memory device, and quickly and stably processing data to the memory device, and an operating method thereof.

In an embodiment, a memory system may include: a plurality of memory dies; and a controller suitable for identifying a dependency between first and second commands and a priority order of the first and the second commands through a check engine, and control the memory dies to sequentially perform first and second command operations in response to the first and second commands according to the dependency and the priority order.

When the controller identifies the dependency between the first and second commands, the controller may hold the second command operation until the first command operation is completed.

When the first command has a higher priority order than the second command, the controller may hold the second command operation until the first command operation is completed.

When there is no dependency between the first and the second commands and no priority order between the first and the second commands, the controller may independently perform the first and second command operations.

The controller may identify the dependency and the priority order through at least one of a Cyclical Redundancy Check (CRC) engine and a hash code engine.

The controller may identify the dependency and the priority order by performing a XOR operation or a correlation operation on addresses of the first and second commands.

The controller may include an address check unit suitable for identifying the dependency and priority order between the first and second commands. The address check unit may include: an operation section suitable for performing a XOR operation on addresses of the first and second commands; a storage section suitable for storing the dependency and priority order as a bitmap value; and an output section suitable for outputting a check value of the dependency and priority order through an operation value of the operation section and the bitmap value.

The controller may fetch and queue the first and second commands in the commands, and may identify the dependency and the priority order for the queued commands.

The controller may include a queue suitable for queueing the commands, and When there is at least one of the dependency and priority order between, the controller may control the memory dies to sequentially perform the first and second command operations by enqueueing the second command in the queue until the first command operation is completed.

The controller may further register the identified dependency and priority order between the first and second commands in a queue list, and may enqueue the queue list in a tail of the queue.

In an embodiment, an operating method of a memory system including a plurality of memory dies, the method may include: identifying dependency and priority order between first and second commands through a check engine; and controlling the memory dies to sequentially perform first and second command operations in response to the first and second commands according to the dependency and priority order.

The controlling of the memory dies may include holding the second command operation until the first command operation is completed when there is any dependency between the first and second commands.

The first command may have a higher priority order than the second command, and the controlling of the memory dies may include holding the second command operation until the first command operation is completed when there is any priority order between the first and second commands.

The controlling of the memory dies may include independently performing the first and second and operations when there are no dependency and priority order between the first and second commands.

The dependency and priority order may be identified through at least one of a Cyclical Redundancy Check (CRC) engine and a hash code engine.

The identifying of the dependency and priority order may include performing a XOR operation or a correlation operation on addresses of the first and second commands.

The operating method may further include storing the dependency and priority order between the first and second commands as a bitmap value.

In the identifying, the first and second commands in the commands may be fetched and queued, and the dependency and the priority order may be identified for the queued commands.

The operating method may further include queuing the commands through a queue, the controlling the, memory dies may include enqueueing the second command in the queue until the first command operation is completed when there is at least one of the dependency and priority order between.

The operating method may further include: registering the identified dependency and priority order between the first and second commands in a queue list; and enqueuing the queue list in a tail of the queue.

DETAILED DESCRIPTION

Figure 1:
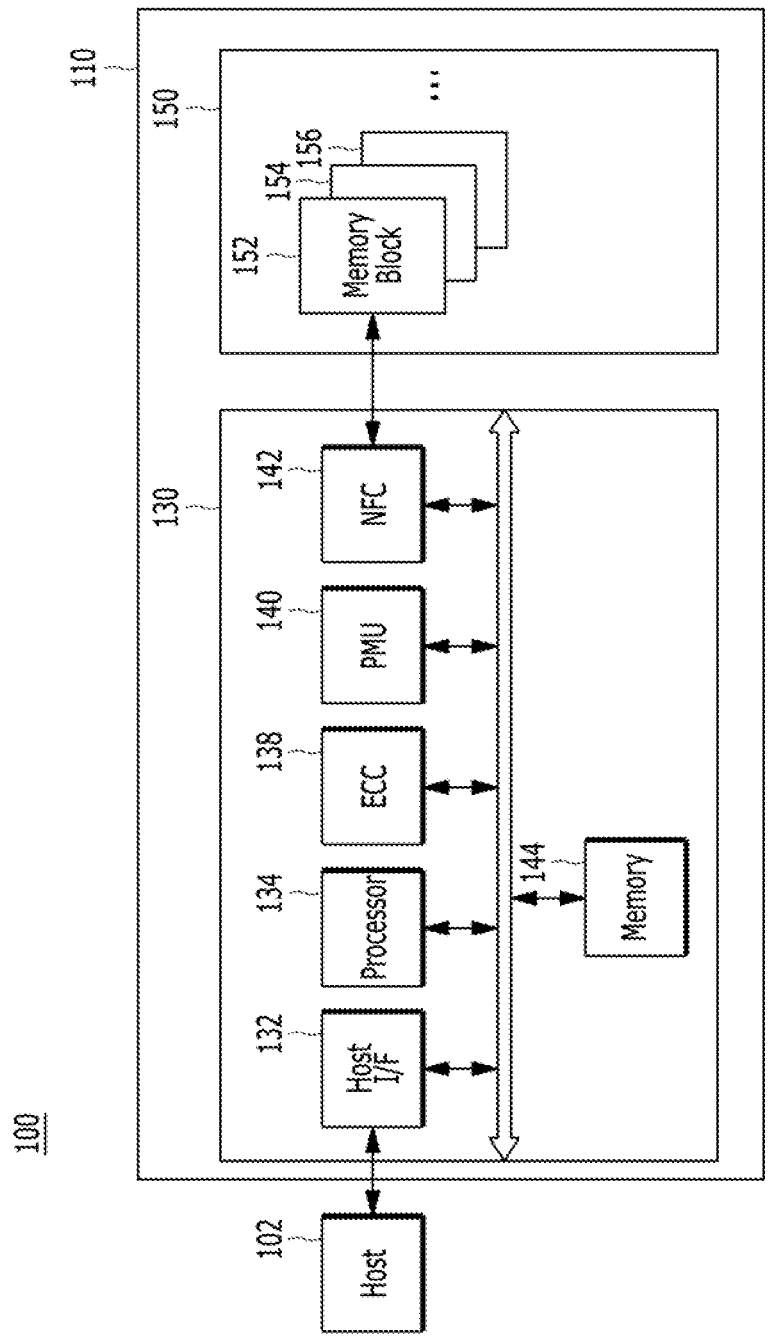
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not: necessarily to scale and, in some instances, proportions may have been exaggerated in priority order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a mean ng that is consistent with their meaning in the context of the present disclosure and the relevant art and will not be interpreted in an idealized or overly formal sense unless expressly so defined herein.

In the following description, numerous specific details are set forth in priority order to provide a thorough understanding of the present invention. The present invention may be practiced without some or all of these specific details. In other instances, well-known process structures and/or processes have not been described in detail in priority order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include portable electronic devices such as a mobile phone, MP3 player and laptop computer or non-portable electronic devices such as a desktop computer game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM) resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (BATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a work ng memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
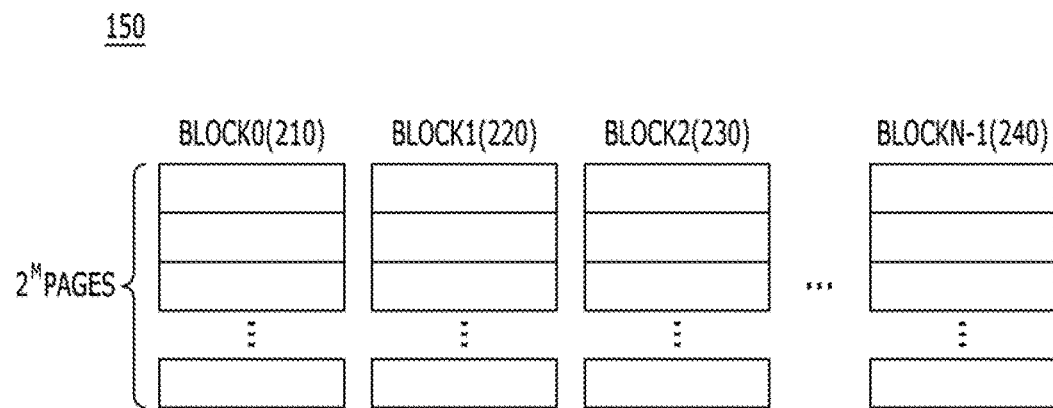
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth.

Figure 3:
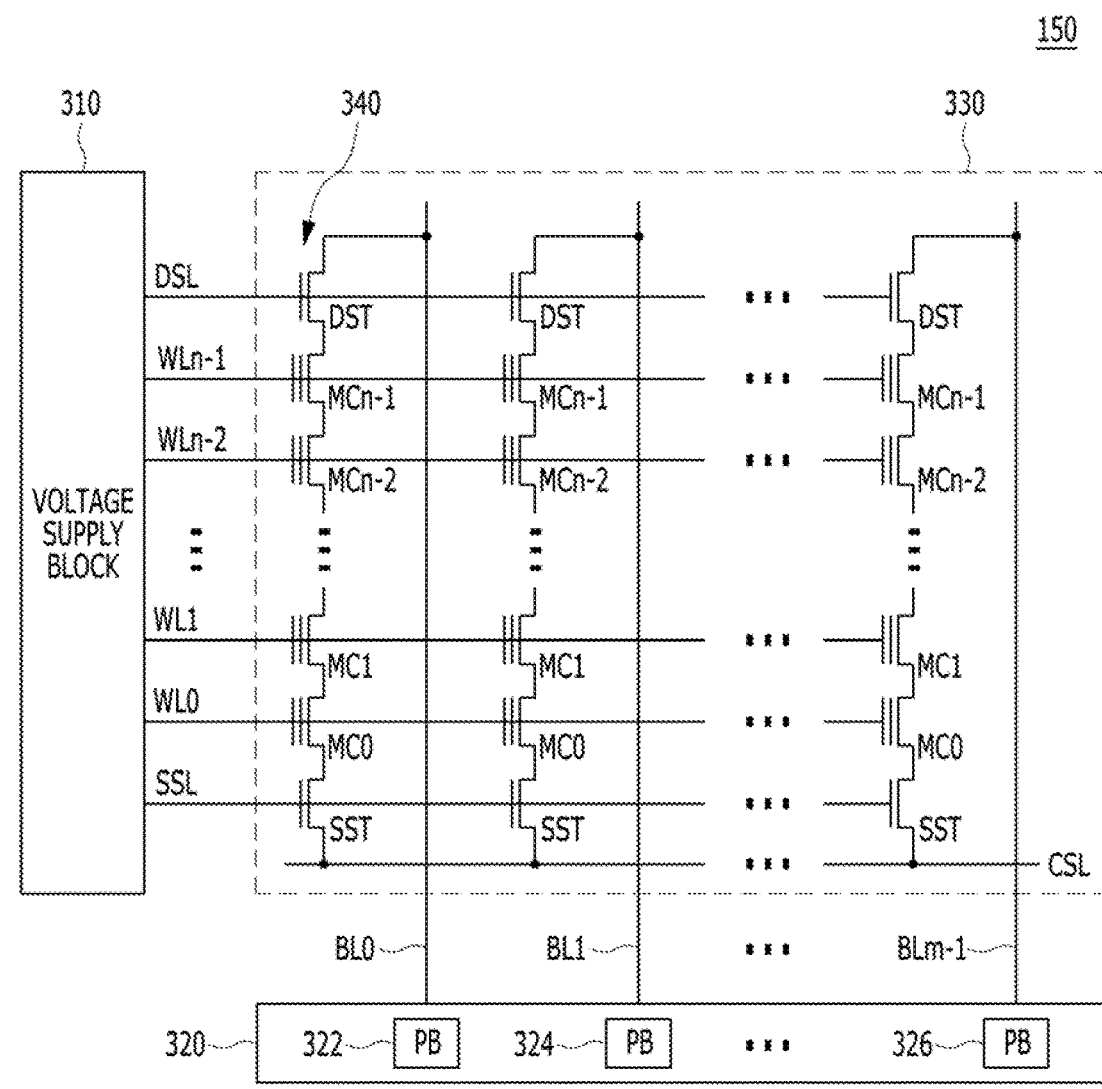
FIG. 3 is a circuit diagram illustrating an exemplary configuration of a memory cell array of a memory block in the memory device of FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may Include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 156 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored in the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
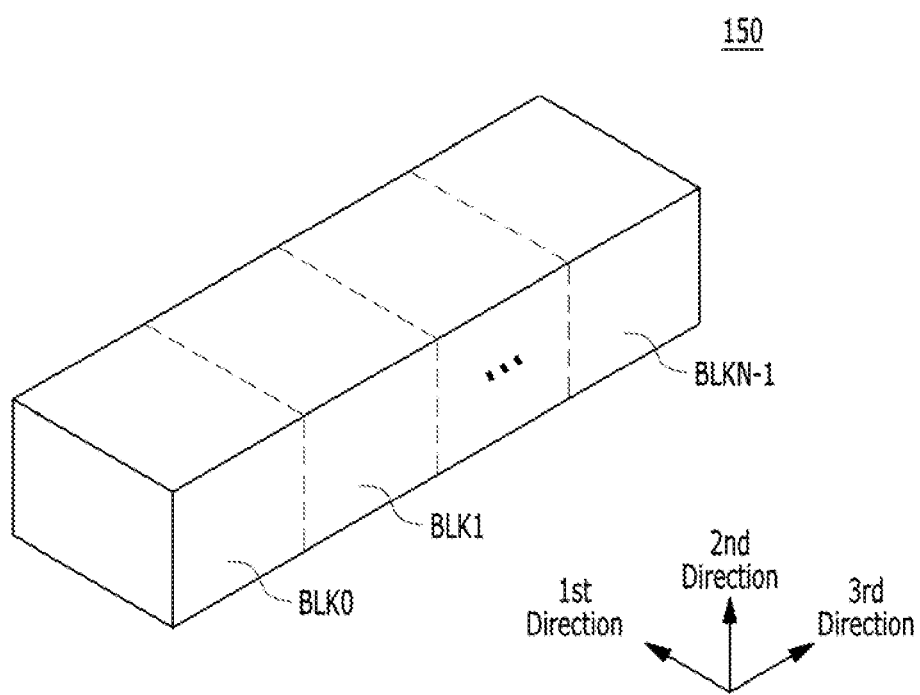
FIG. 4 is a schematic diagram illustrating an exemplary three-dimensional structure of the memory device of FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each of the memory blocks having a 3D structure (or vertical structure).

FIGS. 5 to 8 are diagrams for schematically explaining an operation of the memory system 110.

In an embodiment of the present disclosure, the controller 130 may identify dependency and priority order between a first command and a second command provided from the host 102, and perform operations in response to the first and second commands according to the identified dependency and priority order between the first and second commands.

In the case in which there is a dependency between the first and second commands, when the second command is provided during a first command operation corresponding to the first provided command, for example, the first command, the controller 130 holds a second command operation corresponding to the second command until the first command operation is completed, and performs the second command operation after the first command operation is completed.

In addition, when there is a priority order between the first and second commands, and, for example, the first command has a higher priority order, the controller 130 holds the second command operation corresponding to the second command until the first command operation corresponding to the first command having a higher priority order is completed, and performs the second command operation after the first command operation is completed. Particularly, even when the first command and the second command are simultaneously provided or the first command is provided after the second command is provided, the controller 130 may hold the second command operation until the first command operation is completed, and perform the second command operation after the first command operation is completed.

Furthermore, in the case in which there is no dependency or priority order between the first and second commands, when the second command is provided during the first command operation corresponding to the first provided command, for example, the first command, the controller 130 independently performs the second command operation corresponding to the second command regardless of whether the first command operation is completed.

Figure 5:
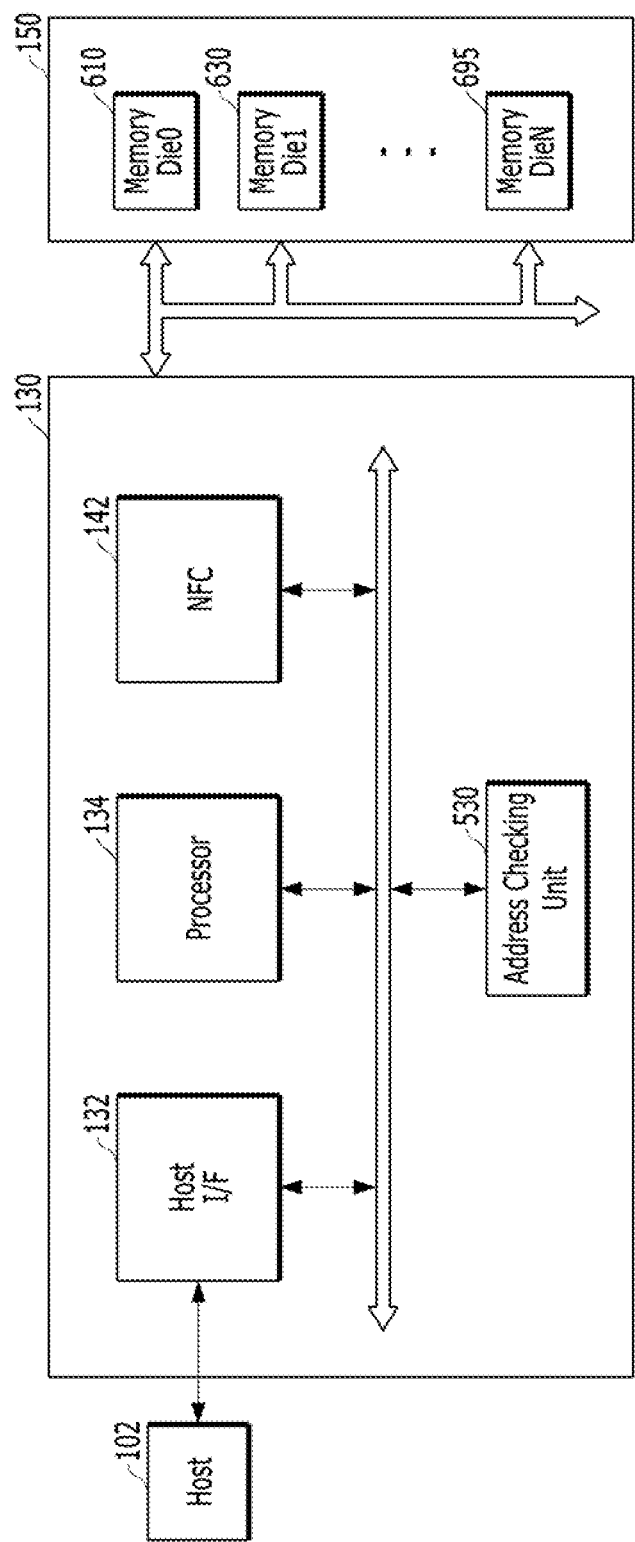
FIGS. 5 to 8 are diagrams for schematically explaining an operation of the memory system shown in FIG. 1.

Referring to FIG. 5, the controller 130 includes the host interface (I/F) unit 132 that receives a plurality of commands from the host 102 and queues the received commands, the processor 134 that processes commands queued in the host I/F unit 132, and the NFC 142 that transmits commands from the processor 134 to a plurality of memory dies 610, 630, and 695 included in the memory device 150. The controller 130 may further include an address check unit 530 that checks dependency and priority order of the commands. As the plurality of commands are provided to the plurality of memory dies 610, 630, and 695, command operations corresponding to the provided commands may be performed in the plurality of memory dies 610, 630, and 695.

The controller 130 identifies dependency and priority order among the queued commands through the address check unit 530, and transmits the queued commands to the memory dies 610, 630, and 695 through the NFC 142 according to the dependency and priority order among the queued commands, so that the memory dies 610, 630, and 695 perform command operations.

The address check unit 530 identifies the dependency and priority order among the plurality of commands through a check engine, for example, a Cyclical Redundancy Check (CRC) engine or a hash code engine.

Figure 6:
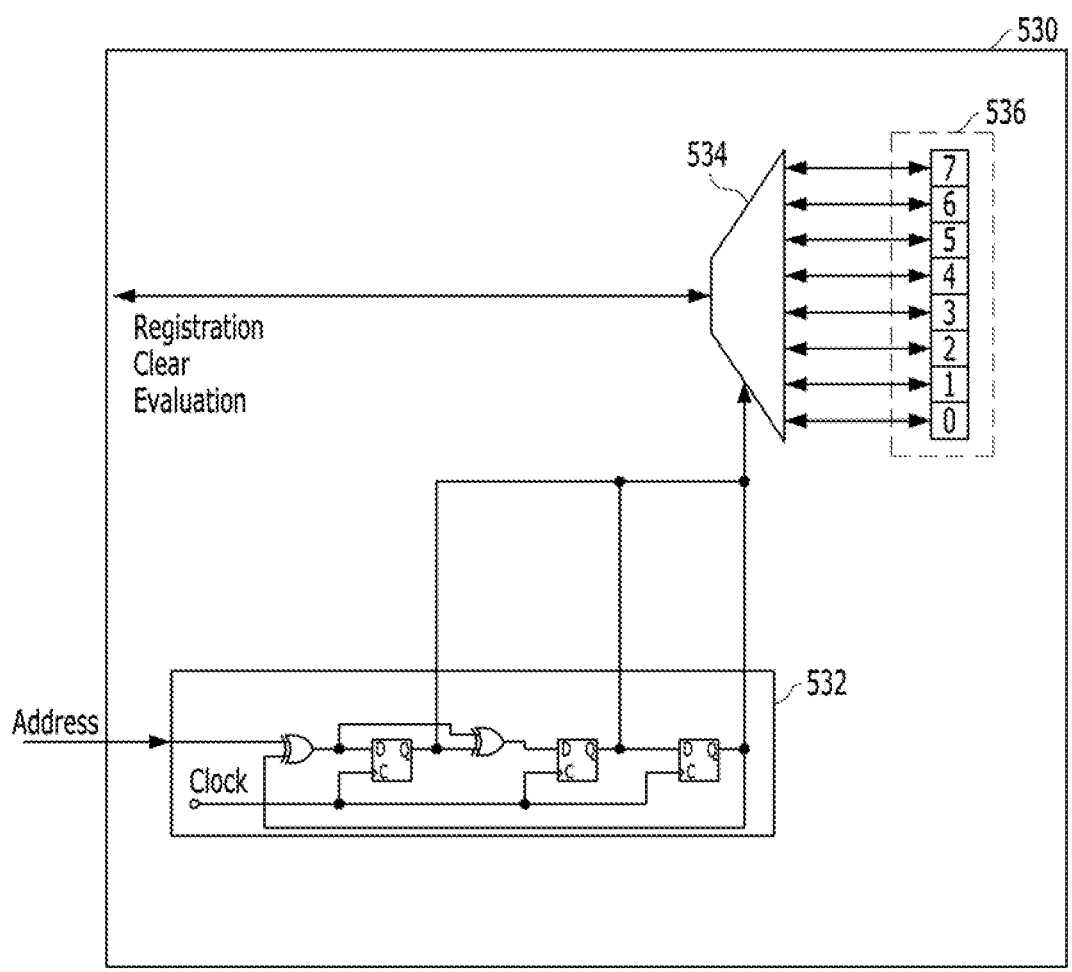

FIG. 6 shows an example of the address check unit 530. Referring to FIG. 6, the address check unit 530 includes an operation section 532, a MUX/DeMUX 534, and a bitmap storage section 536.

The operation section 532 performs an XOR operation to an address of an i-th command, which is among the plurality of commands provided from the host 102, and then the MUX/DeMUX 534 outputs a check value for the dependency and priority order of the i-th command among the plurality of commands through an operation value of the operation section 532 and a bitmap value of the bitmap storage section 536. The check value for the dependency and priority order of the plurality of commands may be in the form of registration, clear, evaluation and the like for the dependency and priority order among the plurality of commands.

The operation section 532 may include a plurality of XOR operators and a plurality of flip-flops, and particularly, may perform the XOR operation on addresses of sequentially inputted commands according to a clock. Furthermore, the operation section 532 may perform a correlation operation on addresses of a plurality of commands. Addresses for the commands may be set and registered in the bitmap storage section 536 in the form of registration, clear, evaluation and the like.

The controller 130 checks characteristics for the plurality of commands received from the host 102, in other words, checks the dependency and priority order among the commands, and then the memory device 150 performs command operations corresponding to the commands. In the case in which there are one or more dependencies and/or priority order difference between the first and second commands, the controller 130 may sequentially perform operations in response to the first and second commands according to the dependency and priority order of the first and second commands as described above.

For example, in the case in which there is dependency between the first and second commands, when the second command is received during a first command operation corresponding to the first received command, for example, the first command, the controller 130 holds a second command operation corresponding to the second command until the first command operation is completed, and performs the second command operation after the first command operation is completed. In addition, when there is priority order difference between the first command and the second command received from the host 102, the controller 130 holds the second command operation corresponding to the second command until the first command operation corresponding to the first command having an upper priority order is completed, and performs the second command operation after the first command operation is completed. Particularly, even when the first command and the second command are received or the first command is received after the second command is received, the controller 130 may hold the second command operation corresponding to the second command until the first command operation corresponding to the first command having the upper priority order is completed, and perform the second command operation after the first command operation is completed. Furthermore, in the case in which there is no dependency and no priority order between the first command and the second command received from the host 102, when the second command is received during the first command operation corresponding to the first received command, for example, the first command, the controller 130 independently performs the second command operation corresponding to the second command at the same time regardless of whether the first command operation is completed.

Furthermore, the memory device 150 may include a plurality of memory dies, for example, N memory dies 610, 630, and 695, each of which performs command operations in response to commands provided from the controller 130.

Figure 7:
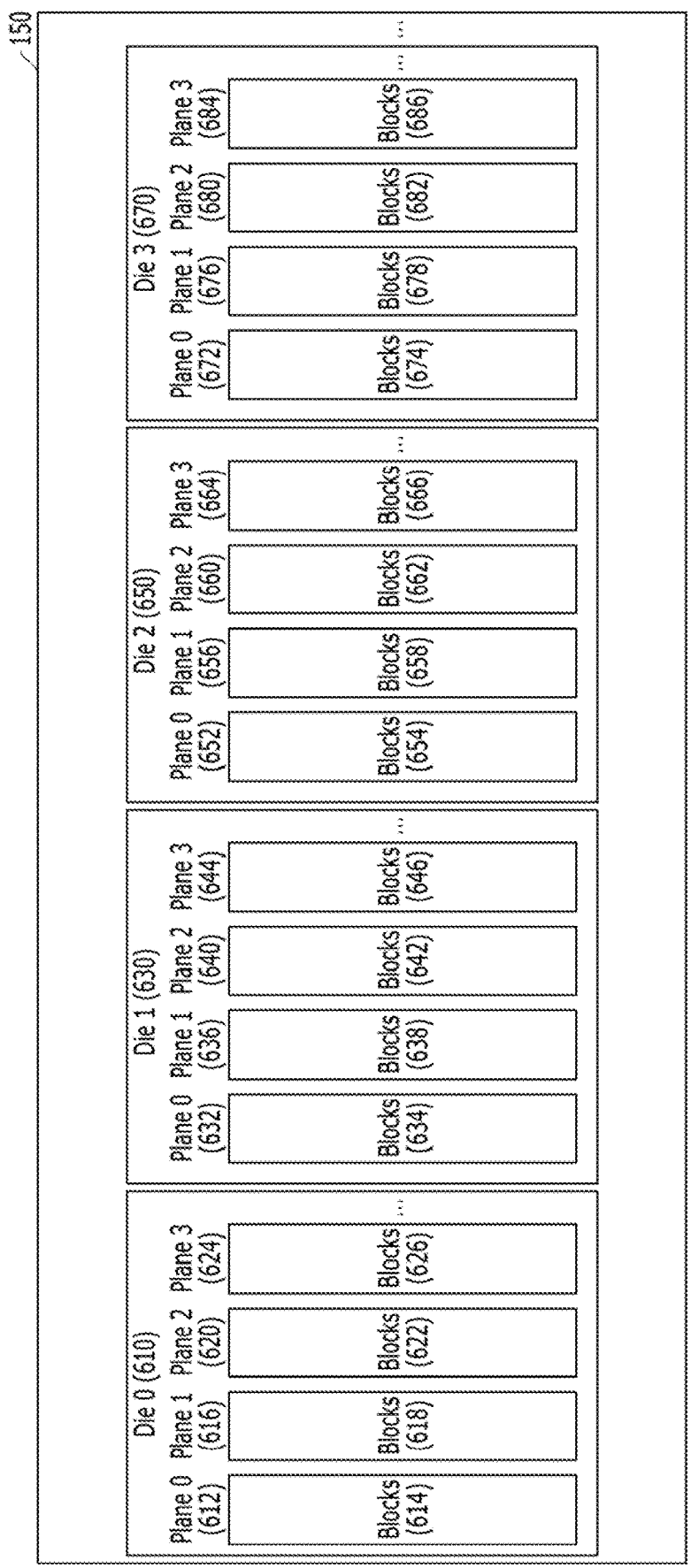

For example, referring to FIG. 7, the memory device 150 includes a plurality of memory dies, for example, a memory die 0 (610), a memory die 1 (613), a memory die 2 (650), and a memory die 3 (670), wherein each of the memory dies 610, 630, 650, and 670 includes a plurality of planes. For example, the memory die 0 (610) includes a plane 0 (612), a plane 1 (616), a plane 2 (620), and a plane 3 (624), the memory die 1 (630) includes a plane 0 (632), a) plane 1 (636), a plane 2 (640), and a plane 3 (644), the memory die 2 (650) includes a plane 0 (652), a plane 1 (656), a plane 2 (660), and a plane 3 (664), and the memory die 3 (670) includes a plane 0 (672), a plane 1 (676), a plane 2 (680), and a plane 3 (684). The planes 612, 616, 620, 624, 632, 636, 640, 644, 652, 656, 660, 664, 672, 676, 680, and 684 in the memory dies 610, 630, 650, and 670 included in the memory device 150 respectively include memory blocks 614, 618, 622, 626, 634, 638, 642, 646, 654, 658, 662, 666, 674, 678, 682, and 686, and for example, a plurality of pages, for example, N blocks Block 0, Block 1, . . . , Block N−1, including $2^M$ pages as described in FIG. 2. Hereinafter, with reference to FIG. 8, a detailed description will be provided, through an example, for the case of checking characteristics of a plurality of commands, in other words, dependency and order among the commands and performing command operations when the memory system in accordance with the embodiment receives the commands from the host 102.

Figure 8:
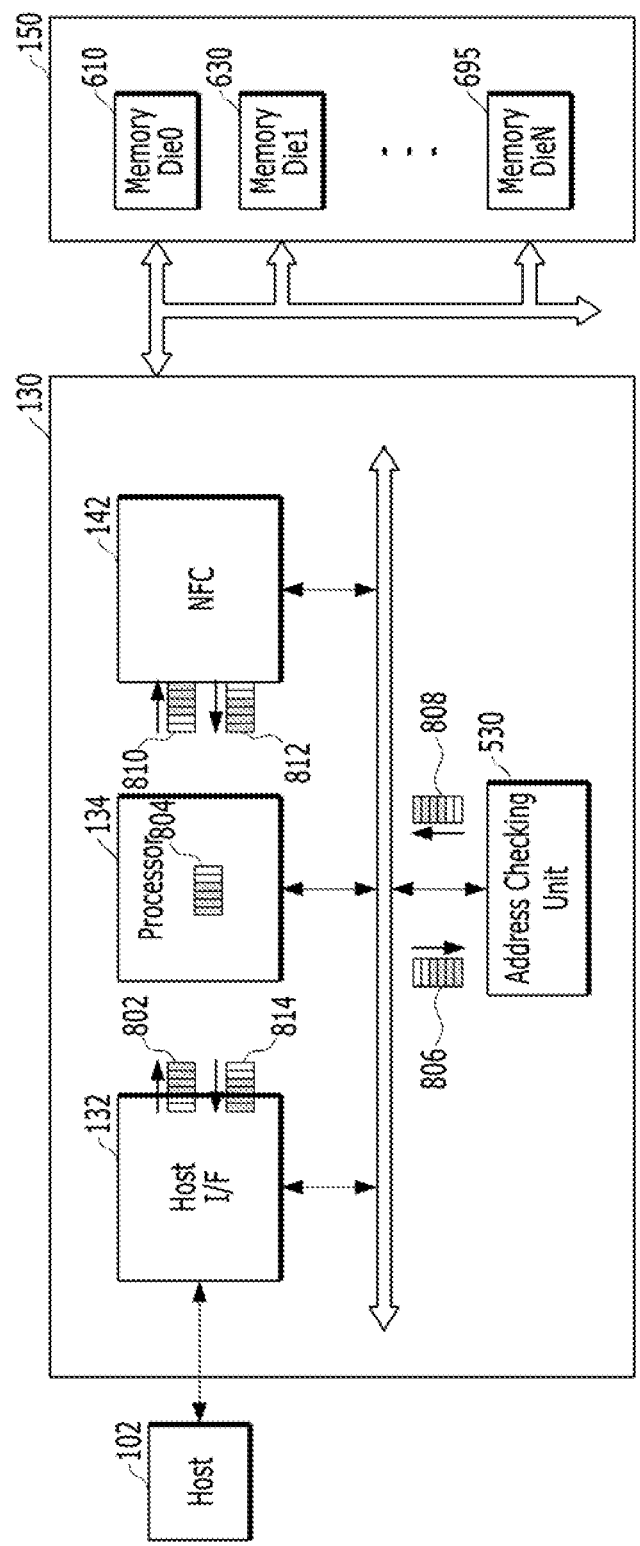

Referring to FIG. 8, the host I/F unit 132 enqueues the plurality of commands, which are provided from the host 102, into a first queue 802 included therein.

The processor 134 parses the enqueued commands of the first queue 802, and enqueues the parsed commands into a second queue 804 included therein. Then, the processor 134 identifies dependency and priority order among the parsed commands of the second queue 804. In this case, the processor 134 identifies the dependency and priority order among the commands through a queue list registered in the second queue 804 and the address check unit 530.

In an example, the processor 134 transmits the parsed commands 804 to the address check unit 530 (refer to reference number 806 in FIG. 8), and requests identification of dependency and priority order among the parsed commands of the second queue 804. As described above, the address check unit 530 identifies the dependency and priority order among the commands through the CRC engine or the hash code engine, and for example, performs an XOR operation or a correlation operation on the addresses of the queued commands 806, and then transmits the commands with the identification result of the dependency and priority order among the commands to the processor 134 (refer to reference number 808 in FIG. 8).

The processor 134 may register addresses of the commands provided from the address check unit 530 in the queue list of the second queue 804, and identifies dependency and priority order among the commands enqueued in the queue list of the second queue 804 according to the identification result of the dependency and priority order of the commands provided from the address check unit 530 as well as the dependency and priority order of the command already enqueued in the queue list of the second queue 804. The addresses of the command provided from the address check unit 530 may be registered and enqueued in a tail of the second queue 804.

When there is any dependency between a first command and a second command enqueued in the second queue 804, the processor 134 transfers a command queue 810 corresponding to the first command to the NFC 142, so that the memory dies 610, 630, and 695 perform a first command operation for the first command. When the first command operation is completed, the processor 134 receives a command completion queue 812 corresponding to the completed first command from the NFC 142. In this case, the processor 134 holds a second command operation corresponding to the second command until the first command operation is completed, and performs the second command operation after the first command operation is completed.

When the second command operation is completed, the processor 134 receives the command completion queue 812 corresponding to the completed second command from the NFC 142. Furthermore, the processor 134 transfers to the host 102 through the host I/F unit 132 the completion queue of the completed first and second commands as a completion queue 814 of the completed commands. In this case, the queue list of the second queue 804 and the dependency between the first and second commands of the bitmap storage section 536 of the address check unit 530 are released.

In addition, when there is any priority order between the first and second commands enqueued in the second queue 804, the processor 134 (see FIG. 1) transfers the command queue 810 corresponding to the first command having an higher priority order to the NFC 142, so that the memory dies 610, 630, and 695 perform the first command operation for the first command. When the first command operation is completed, the processor 134 receives the command completion queue 812 corresponding to the completed first command from the NFC 142. In this case, the processor 134 holds the second command operation corresponding to the second command of a lower priority order until the first command operation is completed, and performs the second command operation after the first command operation is completed.

When the second command operation is completed, the processor 134 receives the command completion queue 812 corresponding to the completed second command from the NFC 142. Furthermore, the processor 134 transfers to the host 102 through the host I/F unit 132 the completion queue of the completed first and second commands as the completion queue 814 of the completed commands. In this case, the queue list of the second queue 804 and the priority order between the first and second commands of the bitmap storage section 536 of the address check unit 530 are released.

In addition, when there is no dependency or priority order between the first and second commands the processor 134 transfers the queue 810 corresponding to the first and second commands to the NFC 142, so that the memory dies 610, 630, and 695 perform the first command operation for the first command and the second command operation corresponding to the second command. When the first command operation and the second command operation are completed, the processor 134 receives the command completion queue 812 corresponding to the completed first and second commands from the NFC 142. Furthermore, the processor 134 transfers to the host 102 through the host I/F unit 132 the completion queue of the completed first and second commands as the completion queue 814 of the completed commands.

In the memory system in accordance with the embodiment as described above, when a plurality of commands are, characteristics of the commands are checked, particularly, dependency and priority order among the commands are checked, and then the memory dies perform command operations for the commands according to the dependency and priority order among the commands, so that it is possible to further improve the operation performance of the memory system. Particularly, the check of the characteristics of the commands, particularly, the check of the dependency and priority order among the commands is more easily checked through a check engine of addresses of the commands, for example, the CRC engine or the hash code engine, so that it is possible to more quickly perform operations for the commands. Hereinafter, with reference to FIG. 9, a detailed description will be provided for an operation of performing command operations corresponding to commands when the memory system in accordance with the embodiment receives a plurality of commands from the host 102.

Figure 9:
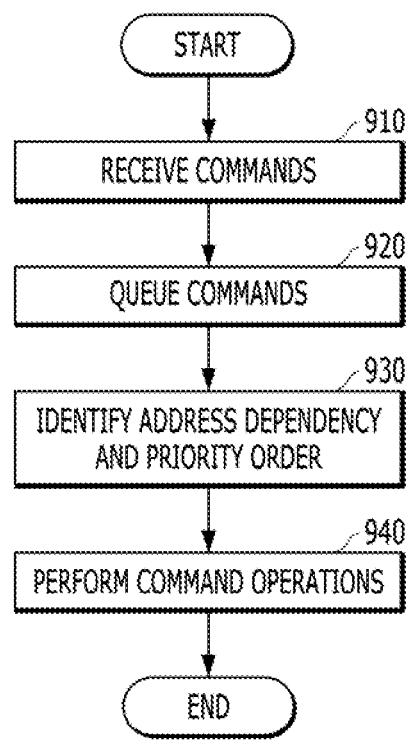
FIG. 9 is a diagram schematically illustrating an operation of the memory system shown in FIGS. 5 to 8.

FIG. 9 is a diagram schematically illustrating a process in which the memory system in accordance with the embodiment performs command operations corresponding to a plurality of commands.

Referring to FIG. 9, the memory system receives a plurality of commands from the host 102 in step 910 and queues the plurality of commands in step 920.

In step 930, the memory system identifies dependency and priority order of the queued commands through a check engine, for example, the CRC engine or the hash code engine.

In step 940, the memory dies included in the memory device 150 perform command operations corresponding to the commands according to the dependency and priority order among the commands.

Since the operation, in which when the plurality of commands are received from the host 102, the characteristics of the commands are checked, particularly, the dependency and priority order among the commands are checked, and then the command operations for the commands are performed according to the dependency and priority order among the commands, has been described in more detail with reference to FIG. 5 to FIG. 8, a detailed description thereof will be omitted. Hereinafter, with reference to FIG. 10 to FIG. 18, a detailed description will be provided for a data processing system and an electronic appliance, which employ the memory system 110 including the memory device 150 and the controller 130 described in FIGS. 1 to FIG. 9 in accordance with various embodiments of the present invention.

FIGS. 10 to 18 are diagrams schematically illustrating application examples of the data processing system of FIGS. 1 to 9

Figure 10:
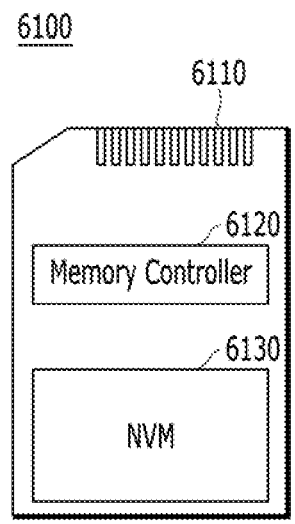
FIGS. 10 to 18 are diagrams schematically illustrating application examples of the data processing system shown in FIG. 1.

FIG. 10 is a diagram schematically illustrating another example of the data processing system 100. FIG. 10 schematically illustrates a memory card system to which the memory system in accordance with the present embodiment is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 9, and the memory device 6130 may correspond to the memory device 150 of the memory system 110 described with reference to FIGS. 1 to 9.

Thus, the memory controller 6120 may include a RAM a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small call disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (SU-RAM). The memory device 6130 may include a plurality of dies as in the memory device 150 of FIG. 5.

The memory controller 6120 and the memory device 6130 may be integrated into a single semiconductor device. For example, the memory controller 620 and the memory device 6130 may construct solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
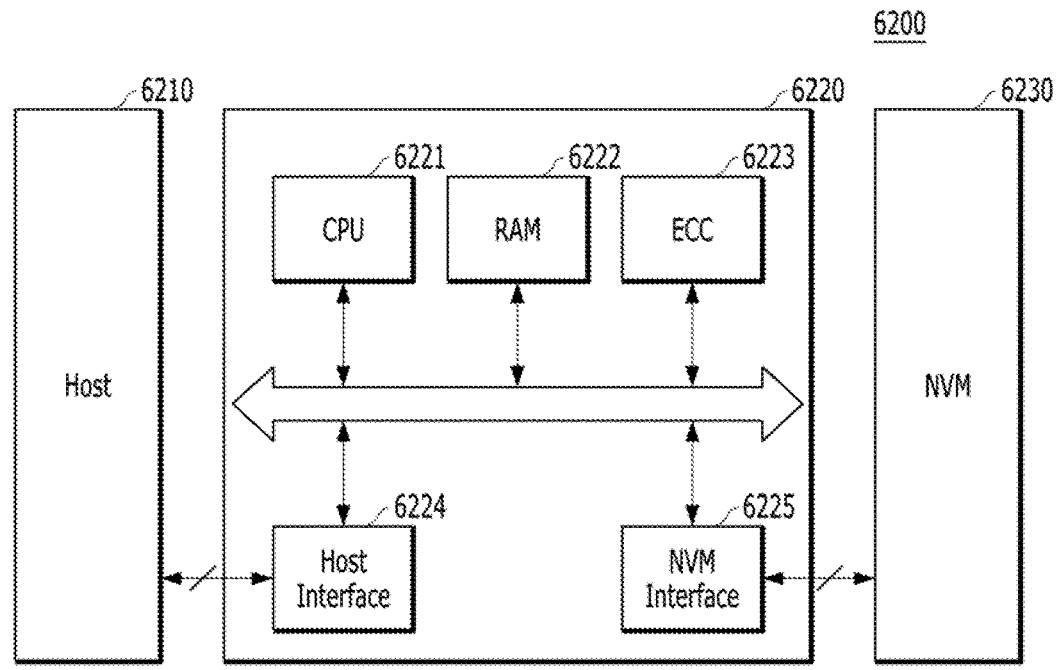

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long-Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
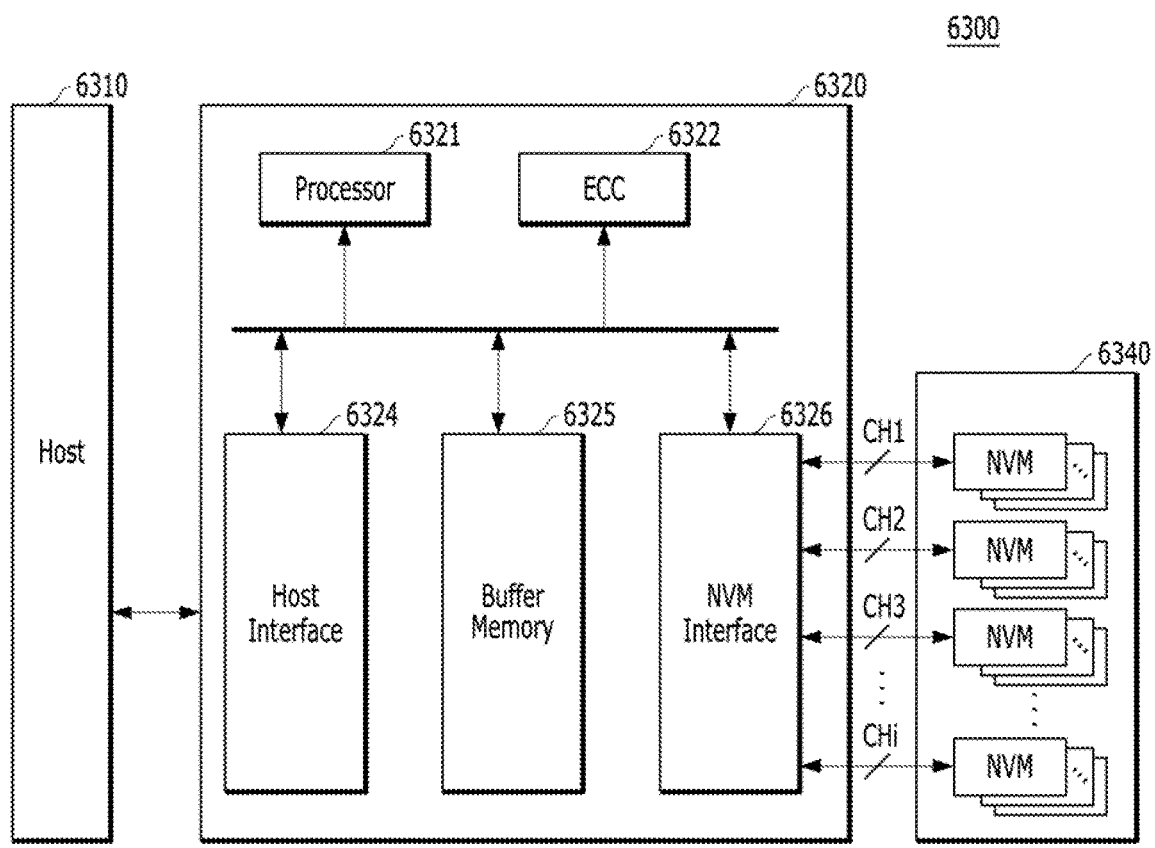

FIG. 12 is a diagram schematically illustrating another example of the data processing system including the memory system in accordance with an embodiment. FIG. 12 schematically illustrates an SSD including the memory system 110.

Referring to FIG. 12, the SSD 6300 may include a controller 6320 and a memory device 6340 including a plurality of nonvolatile memories. The controller 6320 may correspond to the controller 130 in the memory system 110 of FIGS. 1 to 9, and the memory device 6340 may correspond to the memory device 150 in the memory system of FIGS. 1 to 9.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 11 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
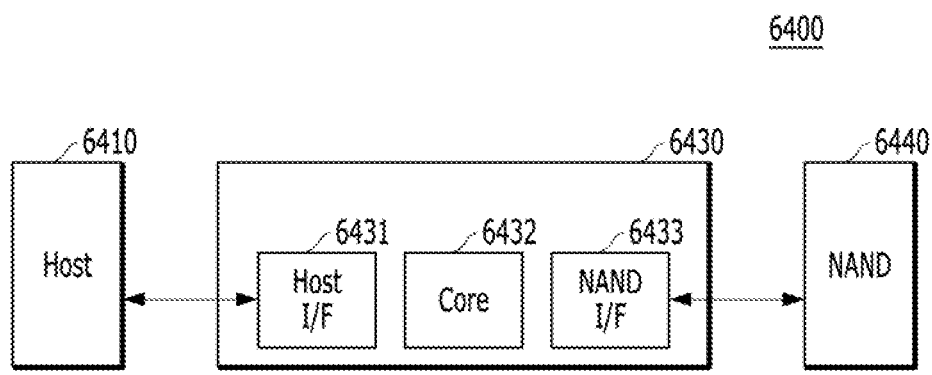

FIG. 13 is a diagram schematically illustrating another example of the data processing system including the memory system in accordance with an embodiment. FIG. 13 schematically illustrates an embedded Multi-Media Card (eMMC) including the memory system 110.

Referring to FIG. 13, the eMMC 6400 may include a controller 6430 and a memory device 6440 embodied by one or more NAND flash memories. The controller 6430 may correspond to the controller 130 in the memory system 110 of FIGS. 1 to 9, and the memory device 6440 may correspond to the memory device 150 in the memory system 110 of FIGS. 1 to 9.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with an embodiment. Specifically, FIGS. 14 to 17 schematically illustrate Universal Flash Storage (UFS) systems including the memory system 110.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIDI M-PHY and MIPI Unified Protocol (UniPro) in Mobile Industry Processor Interface (MIPI). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
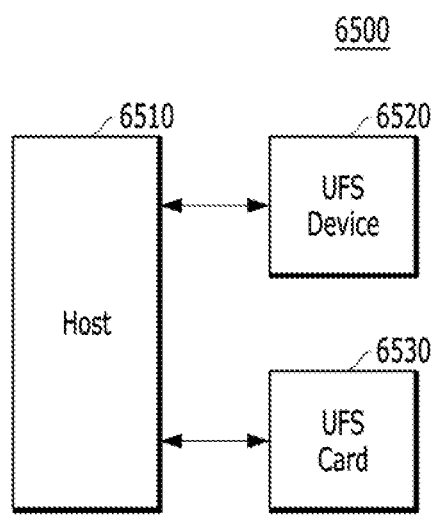

In the UFS system 6500 illustrated in FIG. 14, each of the host 6510, the UFS device 6520 and the UFS card 6530 may include UniPro. The host 6510 may perform a switching operation in priority order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
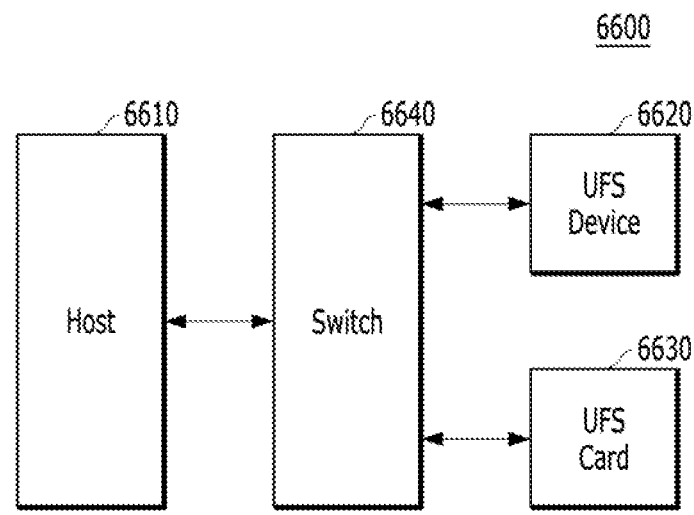

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
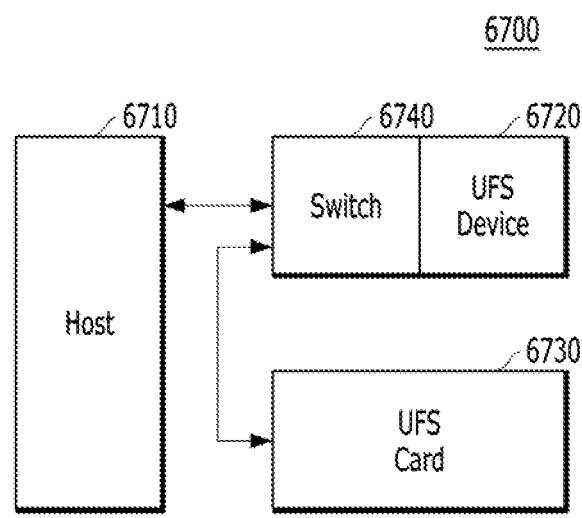

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
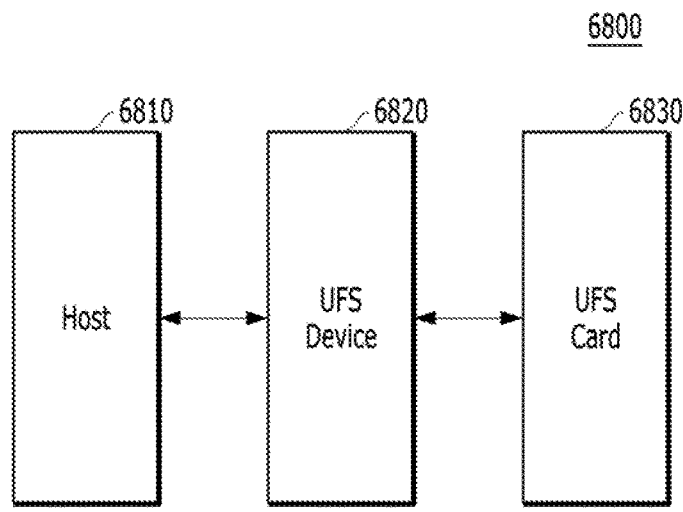

In the UFS system 6800 illustrated in FIG. 17, each of the host 6810, the UFS device 6820 and the UFS card 6830 may include M-PHY and UniPro. The UFS device 6820 may perform a switching operation in priority order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
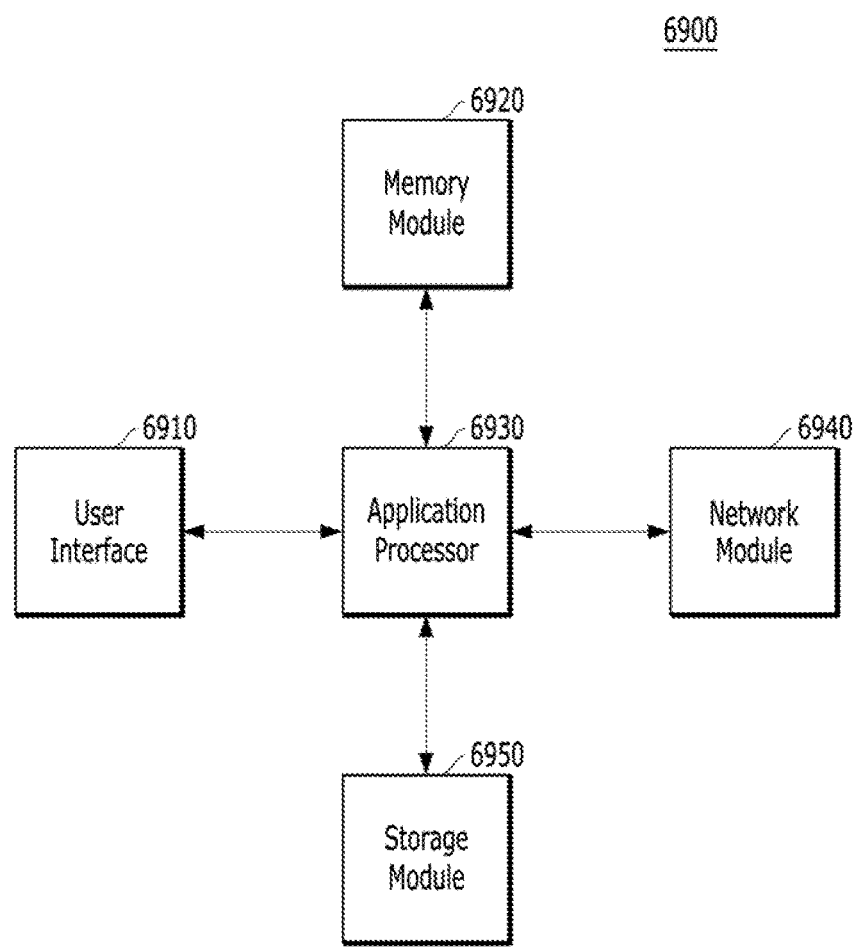

FIG. 18 is a diagram schematically illustrating another example of the data processing system including a memory system in accordance with an embodiment. FIG. 18 is a diagram schematically illustrating user system including the memory system 110.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 to 9. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In the memory system and the operating method thereof in accordance with embodiments, it is possible to minimize complexity and performance deterioration of the memory system, maximize the use efficiency of a memory device, and quickly and stably process data to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a plurality of memory dies; and
a controller configured to transfer plural commands associated with plural addresses to the plurality of memory dies through a plurality of channels to perform each of plural command operations, each corresponding to each command, onto at least one die of the plurality of memory dies,
wherein the controller determines a dependency between the plural commands and a priority order of the plural commands through a check engine, and sequentially performs the plural command operations according to the dependency and the priority order,
wherein the controller comprises an address check unit configured to determine the dependency and priority order between the plural commands by performing an XOR operation on addresses of sequentially inputted commands according to a clock, and
wherein the address check unit comprises:
an operation section configured to perform the XOR on the addresses of the sequentially inputted commands according to the clock operation to generate a multi-bit signal based on comparison results regarding the plural addresses;
a storage section configured to store multi values regarding the dependency and priority order as a bitmap value; and
an output section configured to output a selected value of the multi values stored in the storage section based on the multi-bit signal.

2. The memory system of claim 1, wherein, when the controller determines the dependency between the plural commands, the controller holds a second command operation of the plural command operations until a first command operation of the plural command operations is completed.

3. The memory system of claim 1,
wherein when a first command of the plural commands has a higher priority order than a second command of the plural command, the controller holds a second command operation of the plural command operations until a first command operation of the plural command operations is completed.

4. The memory system of claim 1, wherein, when there is no dependency between the plural commands and no priority order between the plural commands, the controller independently performs the plural command operations.

5. The memory system of claim 1, wherein the controller determines the dependency and the priority order through at least one of a Cyclical Redundancy Check (CRC) engine and a hash code engine.

6. The memory system of claim 1, wherein the controller fetches and queues the plural commands in the plural commands, and determines the dependency and the priority order for the queued commands.

7. The memory system of claim 1,
wherein the controller comprises a queue configured to queue the plural commands, and
wherein, when there is at least one of the dependency and priority order, the controller controls the memory dies to sequentially perform the plural command operations stored in the queue sequentially receiving the plural commands delivered based on the dependency and the priority order.

8. The memory system of claim 7, wherein the controller further registers the determined dependency and priority order between the plural commands in a queue list, and enqueues the queue list in a tail of the queue.

9. An operating method of a memory system including a plurality of memory dies and a controller configured to perform plural command operations, the method comprising:
determining dependency and priority order between plural commands through a check engine;
transfer plural commands associated with plural addresses to the plurality of memory dies through a plurality of channels; and
performing the plural command operations, each corresponding to each command, onto at least one die of the plurality of memory dies according to the dependency and the priority order,
wherein the determining of the dependency and priority order includes:
performing an XOR operation on addresses of sequentially inputted commands according to a clock to generate a multi-bit signal based on comparison results regarding the plural addresses;
storing multi values regarding the dependency and priority order between the plural commands as a bitmap value; and
outputting a selected value of the stored multi values based on the multi-bit signal.

10. The operating method of the memory system of claim 9, the performing of the plural command operations includes holding a second command operation of the plural command operations until a first command operation of the plural command operations is completed when there is any dependency between the plural commands.

11. The memory system of claim 9,
wherein a first command of the plural commands has a higher priority order than a second command of the plural commands, and wherein the performing of the plural command operations includes holding a second command operation of the plural command operations until a first command operation of the plural command operations is completed when there is any priority order between the plural commands.

12. The operating method of the memory system of claim 9, the performing of the plural command operations includes independently performing the plural command operations when there are no dependency and priority order between the plural commands.

13. The operating method of the memory system of claim 9, wherein the dependency and priority order are determined through at least one of a Cyclical Redundancy Check (CRC) engine and a hash code engine.

14. The operating method of the memory system of claim 9, wherein, in the determining, the plural commands are fetched and queued, and the dependency and the priority order are determined for the queued commands.

15. The operating method of the memory system of claim 9,
further comprising queuing the plural commands through a queue,
wherein performing of the plural command operations includes sequentially performing the plural command operations stored in the queue sequentially receiving plural commands delivered based on the dependency and the priority order when there is at least one of the dependency and priority order.

16. The operating method of the memory system of claim 15, further comprising:
registering the determined dependency and priority order between the plural commands in a queue list; and
enqueuing the queue list in a tail of the queue.

* * * * *